Jan. 10, 1950　　　G. MINKOWITZ　　　2,493,894
CLUTCH AND BRAKE MECHANISM
Filed Aug. 30, 1945
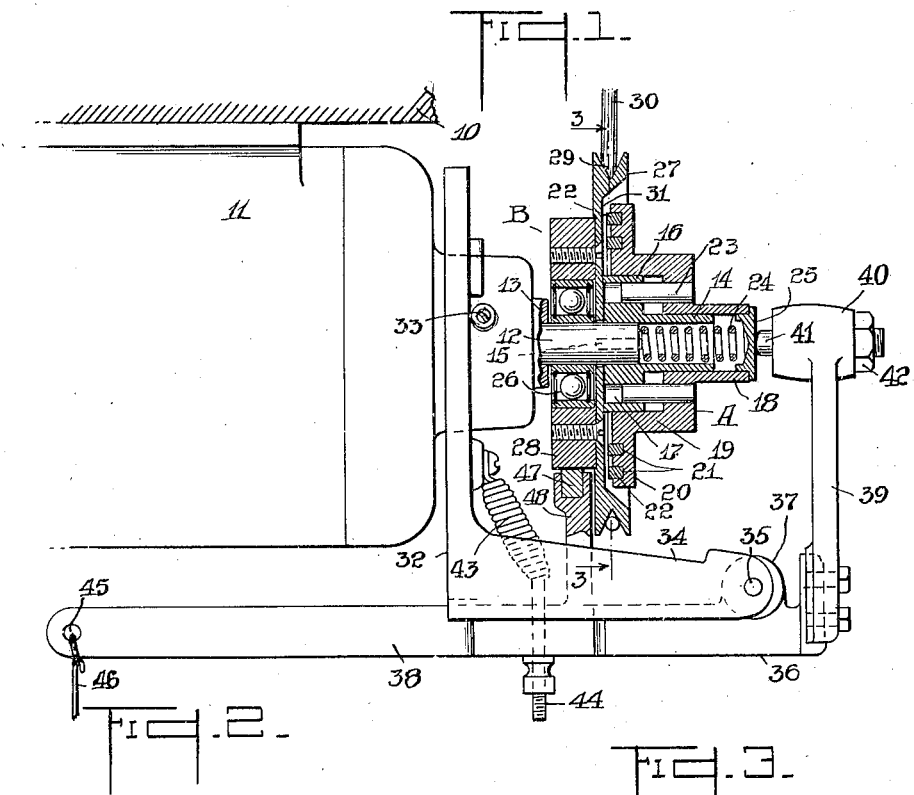
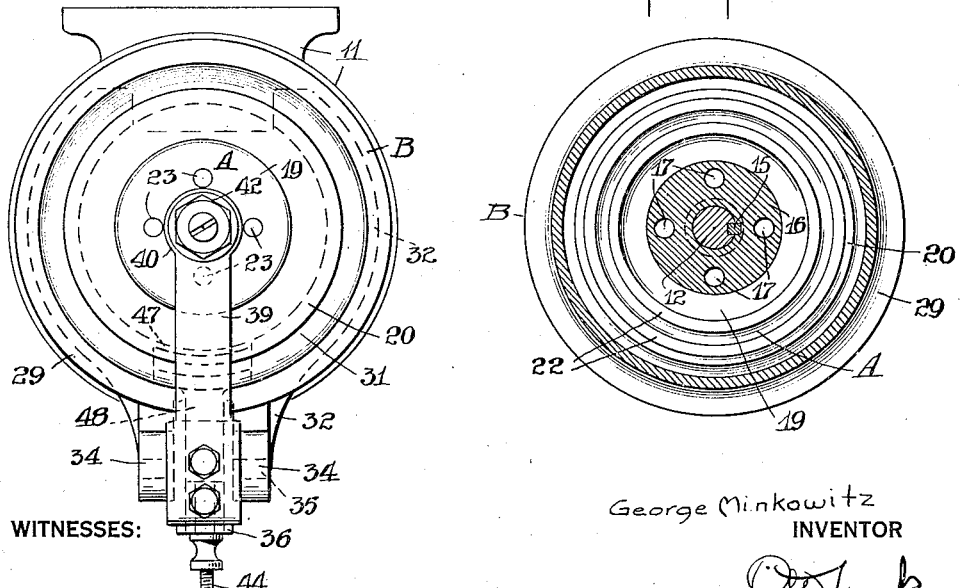
George Minkowitz
INVENTOR
WITNESSES:
BY
his ATTORNEY Patented Jan. 10, 1950

2,493,894

UNITED STATES PATENT OFFICE 2,493,894

CLUTCH AND BRAKE MECHANISM

George Minkowitz, New York, N. Y.

Application August 30, 1945, Serial No. 613,536

7 Claims. (Cl. 192—17)

This invention relates to clutch mechanism comprising a constantly rotating driving member, a driven member and means to connect the members together in an operative manner.

The present invention is particularly applicable to the drive of sewing machines and other mechanical devices in which the driving unit is called upon to pick up the entire operating load of the machine instantly the clutch is engaged.

Clutch devices for sewing machines ordinarily include driving and driven units which when brought into operative relation close an electric switch and start the motor of the driving unit. The motor, as a result, is called upon to pick up speed at approximately the same time it takes on the load of the driven unit. This necessitates the use of a motor having more power than is required to merely operate the machine after the same is put in operation.

My invention has for its object to provide a motor of minimum power for the machine to be operated and to provide clutch means allowing the motor to run constantly at full speed without noise, friction and consequent wear of parts as a result of which the motor, when the clutch is connected, is called upon only to pick up the full load of the driven unit while running at full speed.

I accomplish the object of the invention by means of certain improvements in the construction and arrangement of a clutch which is extremely simple in construction, cheap to manufacture and install and free from defects existing in clutch arrangements in use at the present time.

One embodiment of the present invention is described in the following specification, set forth in the appended claims and illustratively exemplified in the accompanying drawings, in which Fig. 1 is a side elevational view of an electric motor equipped with my improved clutch, which is shown in substantially longitudinal section;

Fig. 2 is an end elevational view of the clutch and operating means; and

Fig. 3 is a substantially transverse sectional view of the clutch taken on lines 3—3 of Figure 1.

Referring to the drawings, 10 denotes the work table upon which the device to be driven is mounted; suspended from the under side of the table 10 is an electric motor 11 having its drive shaft 12 projecting outwardly from a boss 13 provided with a bearing for the shaft and forming an integral part of the end portion of the motor casing.

The outer free end portion of the shaft 12 is provided with a key way and carries a sleeve 14 having a key way which together with the underlying keyway in the shaft 12 accommodates a key 15 as illustrated in Figures 1 and 3. The sleeve 14 comprises an enlarged annular position 16 in which the key 15 is engaged and a tubular portion projecting outwardly beyond the end of the motor shaft 12. The annular portion 16 is provided with a plurality of diametrically oppositely disposed openings 17. Mounted on the tubular portion of the sleeve 14 and upon the annular outer surface of the annular portion 16 is a stepped driving member A, which comprises a hub 18 loosely embracing the tubular portion of the sleeve 14 and movable axially thereof, an annular enlargement or shell 19 loosely embracing the annular portion 16 and movable axially thereof, and an annular flange or clutch plate 20. The inner face of the clutch plate 20 is provided with concentric grooves 21, in which strips of leather or other suitable material 22 are mounted, the contact surfaces of the strips projecting from the face of the flange, as clearly illustrated in Figure 1. It is to be noted that in accordance with the structure just described, the driving member A constitutes the movable member of a clutch, the movement being effected as the hub 18 and shell 19 slide axially of the portion 16 and tubular portion of the sleeve 14. The stepped driving member A is arranged to turn with the sleeve 14 by means of pins 23 fixed in the end wall of the shell 19 and projecting into the openings 17. This construction establishes a rotary connection between the parts and simultaneously axial movement of the member A with respect to the sleeve 14. The member A is urged outwardly and axially of its support by means of a compression spring 24 disposed within the hub 18 and tubular projection of the sleeve 14, one end of the spring 24 abutting the end of the motor shaft 12 and the other end pressing against the closed end 25 of the hub 18 to resiliently urge the driving member A outwardly to disconnect the clutch, as hereinafter described.

As previously described and illustratively exemplified in the drawing, see Figure 1, the driving member of the clutch is mounted on and carried by the outer end portion of the motor shaft 12. The space between the boss 13 and the driving member is used to accommodate the driven member B of the clutch.

The driven member B comprises a bearing 26 mounted on the section of the shaft 12 between the boss 13 and sleeve 14 and a pulley 27 having a hub 28 embracing and being carried by the bearing 26. The pulley 27 has a grooved peripheral track 29 to receive one end loop of a belt 30 and a recessed face having a flat surface 31 disposed opposite the circular contact strips 22 of the flange 20 of the driving member A.

Normally the flange 20 and contact strips 22 are yieldably held away from the surface 31 and the driving member A runs freely. In order to form a contact between the strips 22 and surface 31, the driving member A is moved against the spring 24 and towards the driven member B.

The means used to connect the members together in an operative manner is illustratively exemplified in Figures 1 and 2, and comprises an L-shaped bracket 32, the upright arm of which is divided and straddles the boss 13, the arm being securely attached to the motor casing in any convenient manner e. g. by means of screws 33. The horizontal arm of the bracket is also divided to provide similar supporting arms 34. The arms 34 project parallel with and below the driving and driven members A and B, respectively, and at their free ends they carry a pivot pin 35.

Pivotally mounted on the pin 35 between the arms 34 is an L-shaped lever 36, the hub 37 of the lever being disposed on the lateral arm 38 adjacent the angle and upright arm 39. The upright arm 39 is adjustable as to its length and at its upper free end it carries a socket 40 in which a wood peg 41 is carried. The peg 41 is adjustable axially thereof by means of a nut 42 and outwardly of the lever to coaxially aline the peg 41 with the center of the closed end 25 of the hub 18.

The lever 36 is yieldably supported by means of a spring 43, which is attached at one end to the upright arm of the bracket 32 and to an adjustable screw spindle 44 at its lower and other end, the spindle 44 being mounted in the lateral arm 38, and which tends to lift the latter arm upwardly and the upright arm 39 and peg 41 outwardly of the end 25. The inner free end of the lateral arm 38 is provided with an opening 45 to receive the hook of a depending foot treadle wire or chain 46.

In order to stop the driven member B from turning when the clutch is disconnected and to hold the driven member against movement as long as the clutch remains disconnected a brake arrangement is provided which comprises a semicircular shoot 47 carried by an upright arm 48 of the lateral arm 38 projecting between the two arms 34, the shoot 47 being movable into and out of contact with the outer surface of the hub 28 of the pulley 27. It will be seen that the action of the spring 43 is to urge the shoe 47 against the peripheral surface of the hub 28, thus holding the driven member B against rotary movement, and the peg 41 out of engagement with the driving member A.

According to the present invention when the clutch is disconnected the driving member A runs freely with the motor shaft and the motor is under absolutely no load. As the lever 36 is rocked under the pull downwardly of the treadle wire 46 to connect the clutch, the upright arm 39 swings inwardly and the peg 41 forces the driving member to collapse until the circular strips 22 engage and grip the pulley 27 of the driven member, which is released to rotate by the simultaneous release of the brake shoe 47 from the hub 28. Instantly the treadle is released the springs 43 and 24 operate on the lever 36 to disconnect the clutch members and apply the brake, allowing the motor shaft and driving member A to run freely.

Having now described my invention and the manner in which the same operates what I claim and desire to secure by Letters Patent is:

1. A clutch consisting of a motor, a driving member rotated by said motor and a driven member, said driving member comprising separate parts rotating together one inside the other and spring means between said parts to normally disengage the driving member from the driven member, and means disposed to allow coaxial movement of one part relative of the other and into contact with the driven member to connect the driving member to the driven member, said driven member being located between said motor and said driving means.

2. A clutch consisting of a motor, a driving member rotated by said motor, a driven member rotated by said motor and means to connect the members together in an operative manner, said driving member comprising a sleeve adapted to be keyed to a power shaft, a clutch plate turning with said sleeve and capable of coaxial movement thereof, pins on the clutch plate and slidable in the sleeve to attach the plate and driven member together, and a spring to normally urge the sleeve and pins outwardly to disengage the latter from the driven member, said driven member comprising a pulley freely turning coaxially of said driving member, said connecting means being disposed to engage said clutch plate to move the same over the sleeve and into contact with the pulley, said driven member being located between said motor and said driving means.

3. A clutch for a continuously rotating power shaft including a motor operating said shaft comprising a sleeve keyed to and projecting beyond said shaft, a clutch plate having axially disposed pins slidable in openings in the sleeve to attach the plate to said sleeve to rotate therewith and to telescope over the same, spring means between the clutch plate and power shaft to normally disengage the clutch, a pulley loosely turning on said shaft intermediate said motor and said clutch plate, and means to engage the clutch plate and telescope the same over said sleeve into connection with the pulley.

4. A clutch, as claimed in claim 3, in which said connecting means comprises a pivotally mounted lever, one end of which is movable towards and into engagement with the clutch plate to move the same coaxially of said sleeve, and resilient means to hold said means against unintentional movement thereof to apply the clutch.

5. A clutch, as claimed in claim 3, in which said connecting means comprises a pivotally mounted lever, one end of which is movable towards and into engagement with the clutch plate to move the same coaxially of said sleeve, and resilient means to hold said means against unintentional movement thereof to apply the clutch, and a brake shoe carried by said lever to engage and hold the pulley against rotary movement when the clutch is disengaged.

6. A clutch for a continuously rotating power shaft, comprising a sleeve keyed to said shaft and projecting beyond the latter, said sleeve having an annular portion provided with spaced openings disposed axially thereof, a clutch plate having hub portion to fit loosely over said sleeve and annular portion thereof and being provided with projecting clutch material arranged on its clutch face, projections on said plate to slide axially in said openings, a spring disposed between the sleeve and said hub portion of the clutch plate to urge the latter outwardly, a driven member mounted on said shaft adjacent said plate, comprising a bearing unit on said shaft, a hub carried on the bearing and provided with a pulley on the side adjacent the clutch plate, the pulley being recessed on its face to receive the said plate and be engaged by the clutch material, and operating means for said clutch, comprising a fixed bracket having spaced arms projecting beneath said clutch plate and driven member, an L-shaped lever pivoted between the free ends of said arms, one arm of the lever projecting upwardly to move against the hub of the clutch plate and the other arm carrying a brake shoe normally in contact with the pulley hub to hold the same against rotary movement, yieldable means to support the latter arm and hold the shoe in braking position, and means to rock said lever arm and simultaneously move the clutch plate into connection with the pulley and the brake shoe out of contact with the pulley hub.

7. A clutch, as claimed in claim 6, including a spring in said sleeve of the said power shaft to yieldably abut the hub of the clutch plate to hold the same out of engagement with the pulley.

GEORGE MINKOWITZ.

REFERENCES CITED

The following references are of record in the file of this patent:

UNITED STATES PATENTS

| Number | Name | Date |
|---|---|---|
| 508,075 | Abercrombie et al. | Nov. 7, 1893 |
| 909,631 | Marx | Jan. 12, 1909 |
| 1,739,751 | Cartwright et al. | Dec. 17, 1929 |
| 2,133,228 | Le Vesconte | Oct. 11, 1938 |
| 2,179,360 | Vasta | Nov. 7, 1939 |
| 2,308,680 | Eason | Jan. 19, 1943 |

FOREIGN PATENTS

| Number | Country | Date |
|---|---|---|
| 449,639 | Great Britain | July 1, 1936 |